United States Patent
Barach (10) Patent No.: US 6,973,044 B1
(45) Date of Patent: Dec. 6, 2005

(54) EFFICIENT METHOD FOR COLLECTING STATISTICS VIA A HALF-DUPLEX SERIAL BUS

(75) Inventor: David Barach, Boxboro, MA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/532,988

(22) Filed: Mar. 22, 2000

(51) Int. Cl.[7] .............................................. H04J 3/18
(52) U.S. Cl. .................... 370/252; 370/449; 370/477; 370/296
(58) Field of Search ............... 370/241, 248, 370/252, 419, 420, 421, 438, 439, 449, 450, 370/451, 468, 477, 528, 229, 230, 276, 296, 370/412, 428

(56) References Cited

U.S. PATENT DOCUMENTS

| | | | |
|---|---|---|---|
| 5,495,522 A | * | 2/1996 | Allen et al. ............ 379/202.01 |
| 5,544,172 A | * | 8/1996 | Abbas ........................ 370/505 |
| 5,548,725 A | * | 8/1996 | Tanaka et al. ............... 709/208 |
| 5,650,825 A | * | 7/1997 | Naimpally et al. .......... 348/465 |
| 6,157,656 A | * | 12/2000 | Lindgren et al. ............ 370/458 |
| 6,449,663 B1 | * | 9/2002 | Carney et al. ................ 710/15 |

* cited by examiner

*Primary Examiner*—Alpus H. Hsu
*Assistant Examiner*—Daniel Ryman
(74) *Attorney, Agent, or Firm*—Hamilton, Brook, Smith & Reynolds, P.C.

(57) ABSTRACT

A system controller on a half-duplex communication bus architecture gathers statistical data from at least one line card. The line card automatically collects statistical data for the system controller in a controlled manner in an information buffer. Then, the line card reports a subset of the statistical data in the buffer to the system controller when polled either for the statistical data or for some other reason and the statistical data is selected to be reported. The line card reports the statistical data in place of reporting a null response in the preferred embodiment whenever possible.

40 Claims, 10 Drawing Sheets

(PRIOR ART)

EFFICIENT METHOD FOR COLLECTING STATISTICS VIA A HALF-DUPLEX SERIAL BUS

BACKGROUND OF THE INVENTION

In the world of computer networks, such as the Internet, service providers are relying more and more on machines to monitor machines, for reasons such as automating service call request. There are networking devices, laborers, that perform the tasks and networking devices, supervisors, that perform the monitoring. It is the job of the supervisors to ask the laborers the status of various job functions with which the laborers are tasked. It is also the job of the supervisors to report, to a higher supervising authority, status of the health of the laborers. Relationships between supervisor and laborer devices exist in other areas besides networks, such as factory automation, telecommunications, and other computer controlled, networked applications.

In the case of computer network applications, the laborers are typically referred to as line cards, which have high speed communication ports. Line cards may generally be referred to as elements, which also includes in its definition intelligent machines or other electronic devices. The primary goal of a line card is to provide good quality connectivity service to clients. To enable the line card to provide service across multiple communication ports, e.g., four or eight ports, simultaneously, the line card is typically fitted with one high-speed modem chip per port. The line card also includes at least one supervisory processor to support the modem chips and gather status data from the modem chips regarding their "health" and status. The processor can generally be a low-cost device relative to the modem chips since gathering health and status data is a low-bandwidth operation relative to the high-bandwidth operation of the high-bandwidth modem chips.

Working up the chain of statistical information data flow, the line card processor(s) gathers status information in response to receiving a request from a supervisor, typically referred to as a system controller. The line card processor gathers the status information from the modem chips, as discussed, and other line card components for other line-card health-related information. The line card processor then transmits the gathered status data to the system controller. The process of requesting, retrieving, and transmitting typically takes several Tx, Rx (transmit/receive) cycles to transmit each message and to fill any required no-data-available-yet voids with "null" response messages.

By way of example, the statistical data gathering may be illustrated by an emerging networking technology, such as DSL (Digital Subscriber Line). DSL is a recent telecommunications protocol allowing simultaneous voice and data service to a subscriber via a single subscriber line. FIGS. 1–4 graphically illustrate the relationships among the supervisors and laborers, employing a half-duplex serial bus communication protocol, within the context of the DSL technology.

Figure 1:
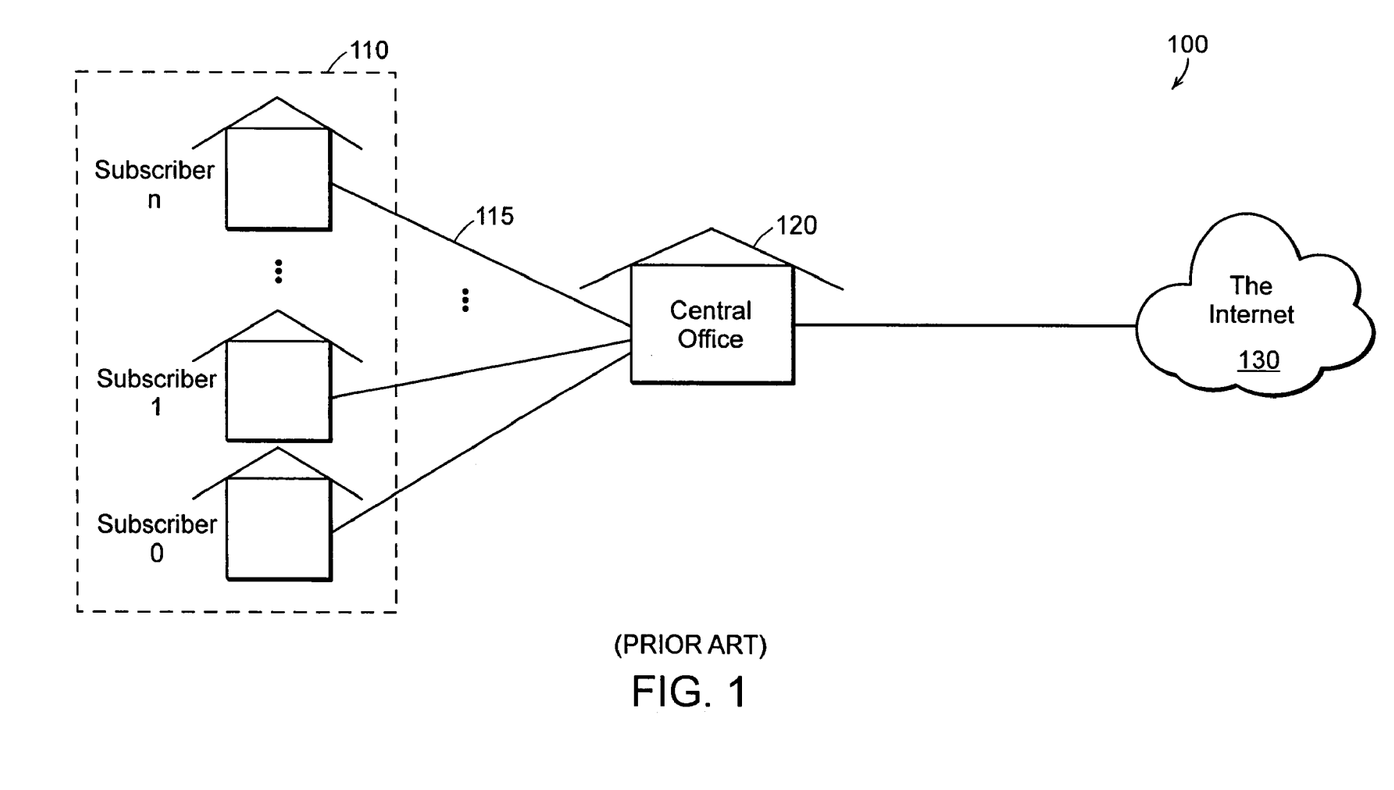
FIG. 1 is a block diagram of an environment in which the present invention may be deployed.

FIG. 1 depicts a typical network 100. This network arrangement allows multiple subscribers 110 to access the Internet 130. Each subscriber has an individual subscriber line 115 that connects to a central office 120. In the case of DSL, each subscriber has a dedicated line to the central office that is always ON; channel sharing occurs farther upstream.

Figure 2:
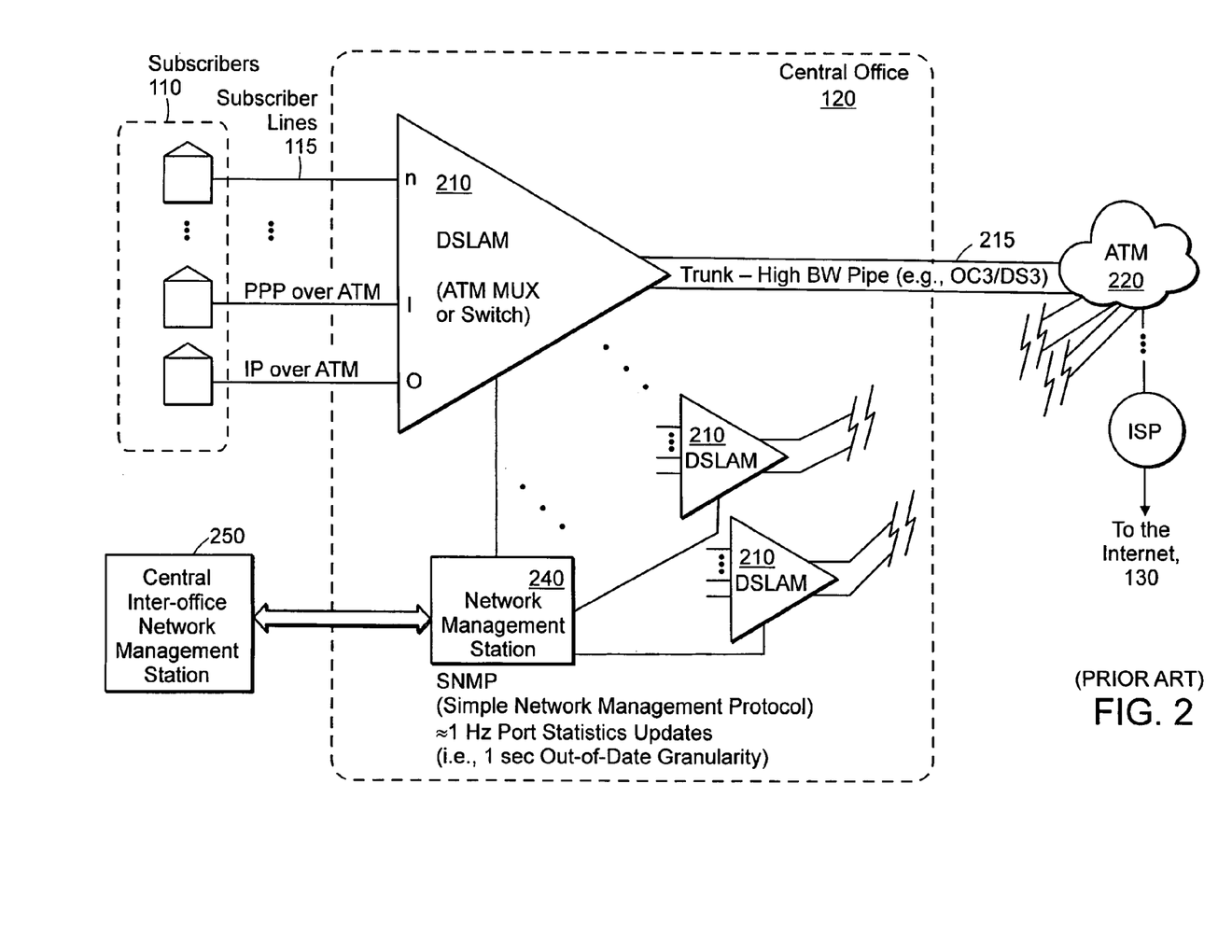
FIG. 2 is a block diagram of a central office in the network environment of FIG. 1.

The dedicated lines are further illustrated in FIG. 2. Within the central office, a DSLAM (Digital Subscriber Line Asynchronous Multiplexer) 210 has n inputs, one corresponding to each subscriber line. Typically, the subscriber lines range from about one to three and one-half miles long, which is useful for servicing a wide coverage area of subscribers (i.e., residential and business addresses).

A typical DSLAM 210 is an ATM (Asynchronous Transmission Mode) MUX (multiplexer) or switch. In a DSLAM system, the subscriber lines may operate various protocols, including PPP over ATM or IP (Internet Protocol) over ATM (RFC 1483), among other existing or developing telecommunication protocols. On the other side of the DSLAM is a communication trunk 215, which typically employs a very high bandwidth communication protocol, such as OC3 or DS3. The trunk is coupled to an ATM network 220 which is further coupled to an ISP (Internet Service Provider) 230.

Still within the central office 120, other DSLAMs are performing the same functions with other subscribers. Multiple DSLAMs operate within a single central office because each subscriber has a dedicated subscriber line to access the Internet, for example. Because of the multiple DSLAMs, the central office 120 is typically equipped with a network management station 240 to collect the statistical data regarding health and status from the DSLAMs. Alternatively, the network management station may be located at a remote location and gather statistical data from the DSLAMs over a network, via standard telephone lines, or through another data transmission system. Further, other network management station/DSLAM hierarchies and configurations (not shown) are within the scope of the present invention. It should be understood that the network management station may be a server or other dedicated computer for managing the DSLAMs and the status information regarding the DSLAMs.

The network management station may use SNMP (Simple Network Management Protocol) to gather the statistical data and other information from the DSLAMs. In SNMP, statistical data of each port is required to be gathered at about a 1 Hz update rate (i.e., one second out-of-date granularity). To account for the 1 Hz update rate, the controllers in each of the DSLAMs must gather the statistical data of each port at 1 Hz and transmit that gathered statistical data of each port to the network management station upon demand.

Further, the network management station 240 provides external communications with a central network management station 250, which is charged with gathering and managing status information for multiple central offices. The central network management station 250 may be located at a central service office. The central service officer dispatches human workers in response to information, gathered by the central management station, suggesting that a subscriber line connecting to a respective DSLAM in a respective central office is experiencing difficulty, either with the line itself or with the communication port in the DSLAM.

Figure 3:
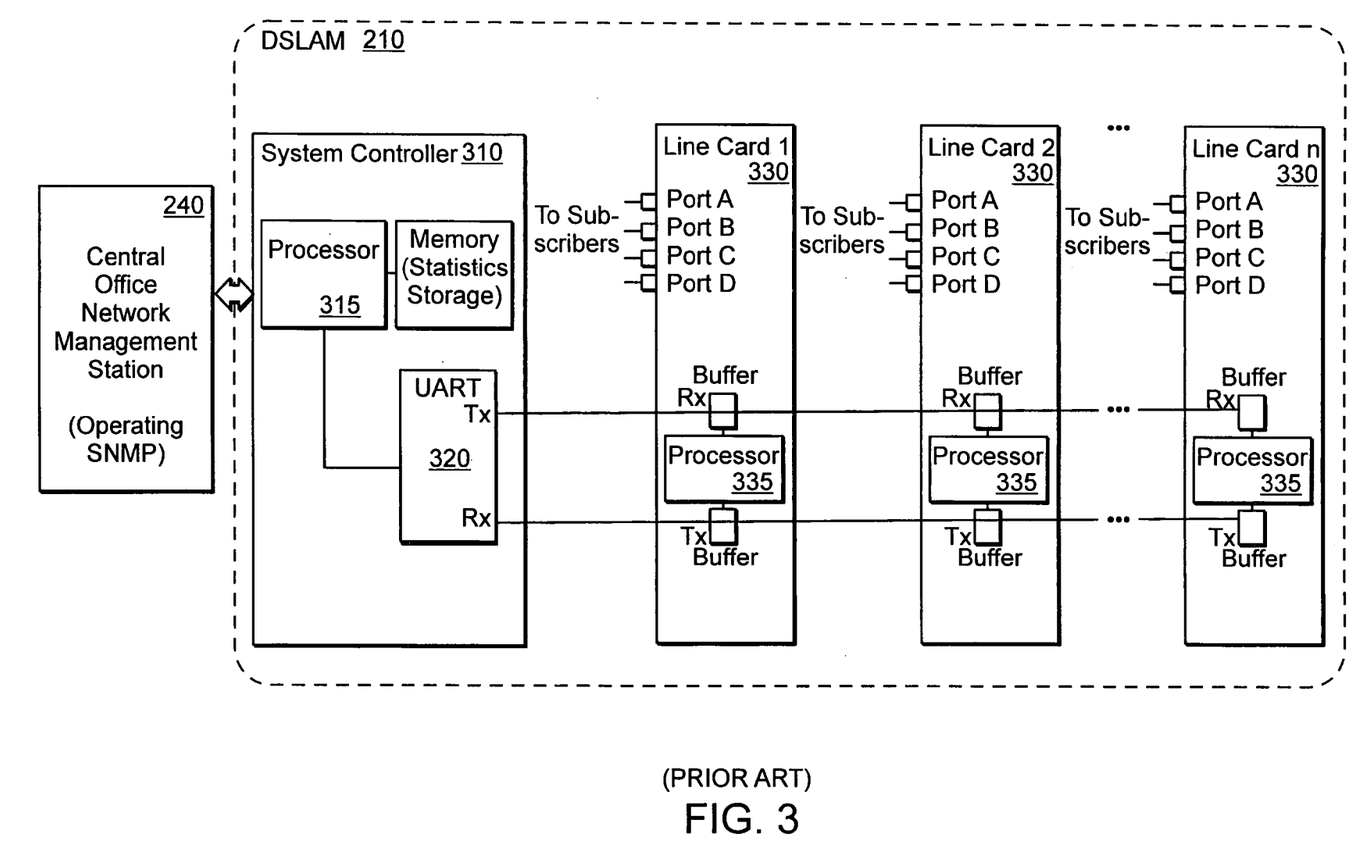
FIG. 3 is a block diagram of an example network device, a DSLAM, operating in the central office of FIG. 2.

FIG. 3 is a more detailed schematic diagram of the DSLAM 210. The DSLAM has a system controller 310 and a plurality of line cards 330. The system controller and line cards reside, typically, in a card-cage chassis having a backplane with typical address and data bus topologies for inter-card communications.

In a typical card-cage chassis (not shown), system controllers and line cards reside in respective, pre-defined, dedicated slots. In one configuration, for example, two system controllers reside in slots 10 and 11, and line cards reside in slots 1–9 and 12–38. Inter-card communications are transacted across a backplane having two serial buses, each serial bus servicing half of the line cards. The backplane is designed in a half-duplex serial bus protocol configuration. In a half-duplex communication protocol, only one card communicates at any one time, and many request, acknowledge, reply, poll, and null messages pass between the system controller and the line card being interrogated in order to retrieve status information, discussed below in reference to FIG. 4.

The system controller 310 has a processor 315 and a UART (Universal Asynchronous Receiver Transmitter) 320. The processor employs the UART to perform inter-device communications. The UART has a transmitter port Tx and a receiver port Rx. The transmitter port communicates to receiver ports on each of the line cards 330. The receiver port in the UART receives data from transmitter ports on the line cards. The UART may be integrated into a FPGA (Field Programmable Gate Array) or some other generic or application-specific integrated circuit.

Each line card includes at least one high-speed communication port that interfaces with a DSL subscriber. In the embodiment depicted in FIG. 3, the line cards employ four ports for high-bandwidth communications. Further, the line cards employ processors 335, which interface with the UART 320 in the system controller through buffers 332, 334 and with the modem chips providing the high-bandwidth communications. Memory (not shown) is used by the processor 335 for storing status information indicating functionality and other aspects of the line cards. The line card processor may also be tasked with managing the half-duplex serial bus protocol.

Figure 4:
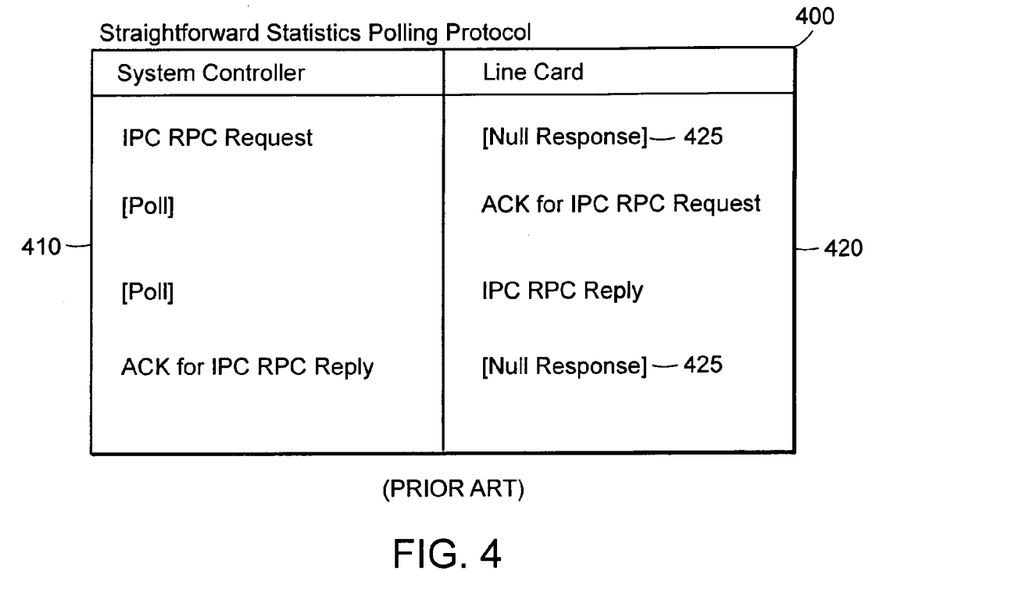
FIG. 4 is a table of a straightforward statistics polling protocol of the prior art operating in the DSLAM of FIG. 3.

FIG. 4 is a chart 400 of a straightforward statistics polling protocol, in the prior art, enabling system controller-to-line card communications. The chart 400 includes two columns: a system controller message column 410 and a line card message column 420. The columns indicate a sequence of message communications back and forth between the system controller and a line card for requesting and transmitting data in the half-duplex communication bus protocol.

In the example sequence of communication messages between the system controller and line card, the system controller requests information from the line card using an IPC RPC request. An IPC RPC request is an interprocessor communication, remote procedure call message to the line card. The interprocessor communication portion indicates to the line card that a processor in the system controller requests information from the line card receiving the message. The remote procedure call indicates to the line card that it is to run an internal software procedure to provide the requested information.

In response to the IPC RPC request, the line card fetches the information from memory or other circuit, such as a modem chip supporting a high-bandwidth communication port. In the meantime, the line card transmits a "null response" message 425 to the system controller. After receiving the null response message, the system controller issues a "poll" message to the line card to determine if the line card has the requested information available. In response to the poll message, the line card issues an acknowledge message for the IPC RPC request. After receiving the acknowledge message, the system controller issues another "poll" message to the line card. The line card, in turn, issues an IPC RPC reply to the system controller with the information requested by the IPC RPS request. Finally, the system controller issues an acknowledge (ACK) for the IPC RPC reply to the line card. Thereafter, the line card issues a null response to end the transaction.

SUMMARY OF THE INVENTION

The problem with the straightforward statistics polling protocol of the prior art, as described in reference to FIG. 4, is the number of non-substantive messages required for transferring data and the reactionary method for gathering the data. As the number of high-bandwidth channels increases on a per line card basis, the more difficult it becomes for the line cards to report the high-bandwidth port status data within an update rate required by statistics gathering protocols, such as the one second update rate required by the SNMP protocol. Specifically, null response messages, issued by the line cards to the system controller to work in the half-duplex serial bus communication protocol, are wasted communication cycles. The present invention replaces non-substantive messages (e.g., null response messages) with substantive data messages (e.g., statistical data providing health and status information regarding high-bandwidth communication ports).

The present invention reduces the bandwidth consumed by gathering data on a communication bus in an efficient manner. A system controller gathers the data from at least one element (e.g., a line card) in a system employing the communication bus. The element performs two functions. First, the element automatically provides data for the system controller. The data may be temporarily stored in a buffer. Second, the element reports a subset of the data in the buffer to the system controller when polled, either for the statistical data or for some other reason. Optionally, the buffer is organized in a queue, and a subset of the statistical data is reported in place of a null response message, for example, whenever the statistical data has reached the head of the queue. To avoid filling the limited-size buffer with only the statistical data, the present invention controls the gathering of data in the queue, preferably by storing only one instance of data per port at any given time in the buffer. In the preferred embodiment, the element reports the data in place of reporting a null response to the system controller whenever possible. The data may be statistical data for high-bandwidth ports or other element-related data. Preferably, the data is reported in a self-identifying message since the system controller typically does not specifically request the data before receiving it.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

One aspect of the present invention replaces dead time in communications between a system controller and an element, such as a line card, operating on a half-duplex serial bus. By replacing dead time, it is meant that any communications that do not provide substantive information from the line card to the system controller are replaced with substantive information. The substantive information may include statistical data, which the system controller often requests or requires from the element. An example of the statistical data is health and status information about high-bandwidth ports on the line card.

The line card pre-gathers the statistical data and stores the statistical data in a self-identifying message in a message buffer, which is preferably organized in the form of a queue. In this way, when a non-substantive message is to be sent back to the system controller to fulfill the requirements of the half-duplex serial bus protocol, the self-identifying, substantive message can be issued in place of the non-substantive message. Referring to FIG. 4, for example, the null responses in the line card responses 420 can be replaced with the pre-gathered, substantive, self-identifying message that includes statistical port data.

Replacing the non-substantive message with port statistical data means that the system controller does not have to provide a formal request for the statistical data because it is automatically presented to the system controller by the line cards. Also, improved system controller and line card communications bandwidth is achieved because non-substantive messages are made substantive according to the teachings of the present invention, thereby reducing lost transmission time while communicating non-substantive messages across the half-duplex serial bus.

The clock rate of a UART (FIG. 3) corresponds to a bandwidth of 1.125 Mbits/sec. Some of the bandwidth is dead air in the communications; some of the bandwidth is taken up by non-substantive communications; and some of the bandwidth is used by substantive communications. Thus, substantive communications operating beyond 40–50 percent channel bandwidth causes loss of data due to the other bandwidth losses.

The well-known SNMP (Simple Network Management Protocol) for gathering the statistical data about the ports and the line cards requires a 1 Hz update rate. Line cards having four ports employing the straightforward statistics polling protocol (FIG. 4) acquires statistical data at approximately 4 Hz. Because it is desirable to increase the number of high-bandwidth ports per card to support wide area network (i.e., the Internet) demand, and due to new technologies such as DSL, there is a push to provide eight ports per line card to increase the number of ports within a central office (FIG. 1). The present invention allows statistical data to be gathered within the 1 Hz latency requirement of SNMP.

Figure 5:
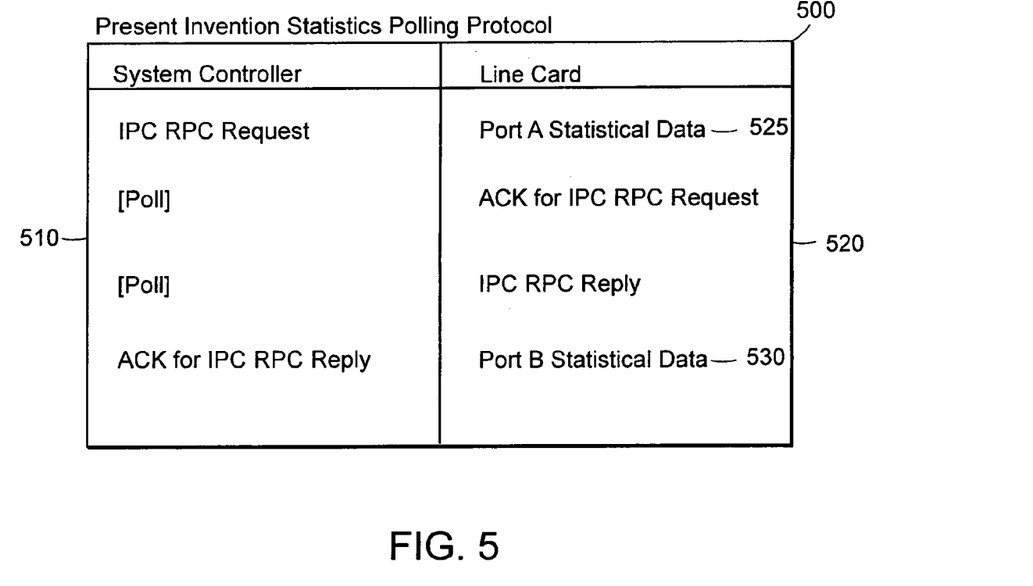
FIG. 5 is a table of an example statistics polling protocol of the present invention operating in the DSLAM of FIG. 3.

FIG. 5 is a chart showing a statistics polling protocol according to the principles of the present invention. The chart 500 includes system controller messages 510 to a line card, and line card messages 520 to the system controller. The difference between the present invention statistics polling protocol chart 500 and the polling protocol of the prior art chart 400 (FIG. 4) are the messages sent from the line card to the system controller in place of the null responses by the prior art. In the present invention, port A statistical data and port B statistical data 525, 530, respectively, is reported from the line card to the system controller in place of null responses. In that way, there are a reduced number of statistical data requests by the system controller. Further, there are a reduced number of wasted cycles, null responses, which are merely used to meet the half-duplex serial bus communication protocol. The port A statistical data and port B statistical data message are self-identifying (i.e., told in the messages what the respective data represent) to help the system controller since it does not explicitly request the data from the line card.

Figure 6:
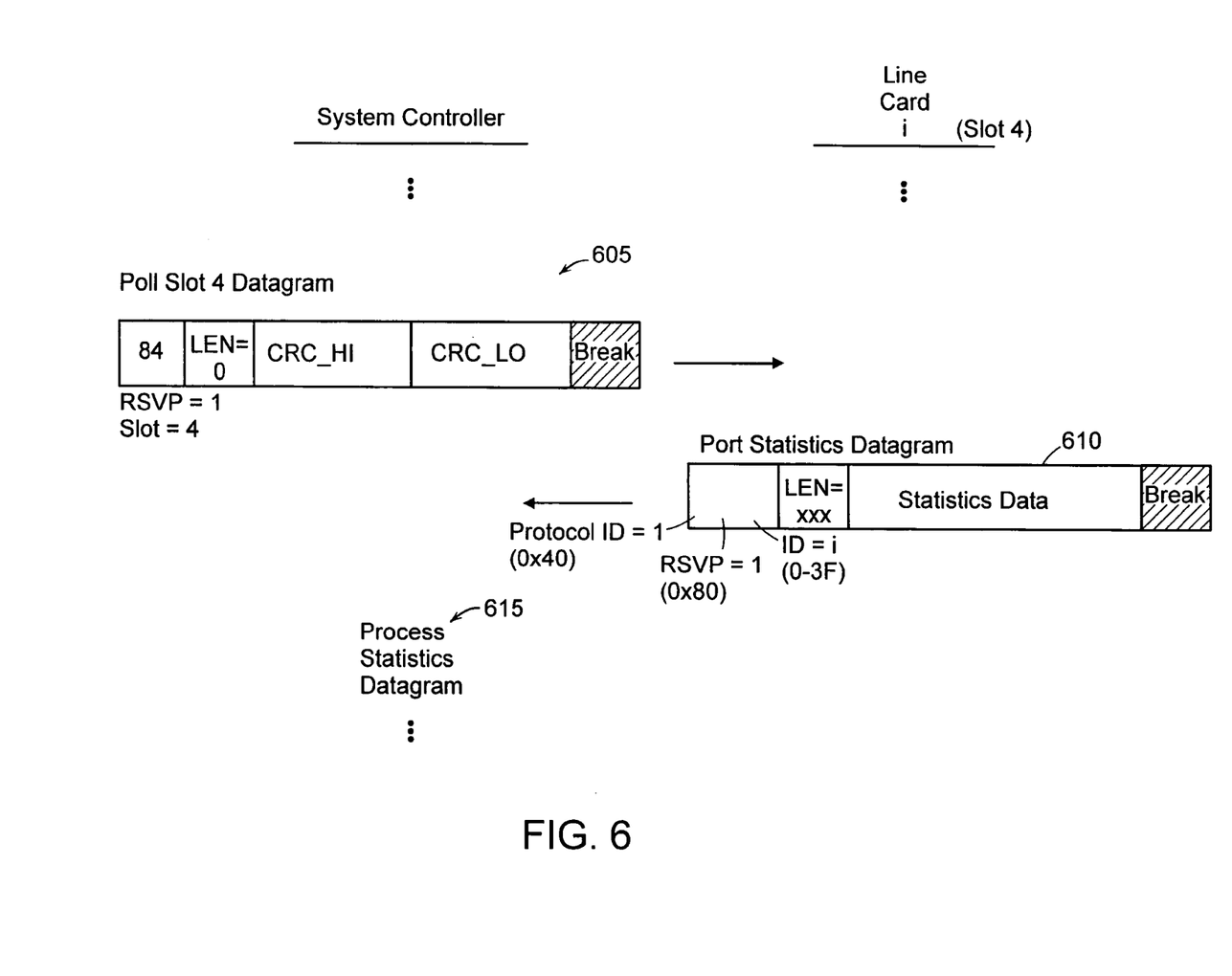
FIG. 6 is a block diagram of a message queue in a line card buffer in the DSLAM of FIG. 3.

FIG. 6 graphically illustrates the messages, or datagrams, passing between the system controller and line cards. In step 605, the system controller provides a poll datagram. The poll datagram is illustrated as a 32-bit message having a typical message format, but may be up to a 255 byte message in the communication protocol. In this case, the datagram is specified to transmit to slot_4. Slot_4 is a slot on a backplane in a chassis in which a line card resides. The poll datagram in step 605 may be any message the system controller can send, including a null message. For example, the poll datagram may be issued to poll the line card to determine whether or not it is on-line.

The line card receives the poll datagram, of step 605, and performs processing based on that datagram. However, in the half-duplex serial bus protocol, the line card is required to provide a response message to the system controller to acknowledge that it has received the datagram. In the past, a null response 425 (FIG. 4) was returned from the line card to the system controller. However, according to the principles of the present invention, the line card returns substantive statistical data in the datagram of step 610. The protocol ID bit is set to "1" which indicates an unsolicited, statistical message, as opposed to something that should be processed by an IOS IPC stack. Examples of solicited messages that are run through the IOS IPC stack include: training, not-in-service, testing, downloading, Far-End LPR (Low Power), Near-End LOS (Loss of Signal), Near-End LOF (Loss of Framing), etc.

In step 615, the system controller receives the unsolicited, self-identifying, statistical datagram and processes that statistical datagram. The processing depends on the information contained in the datagram header and the information included in the substantive information fields.

Figure 7:
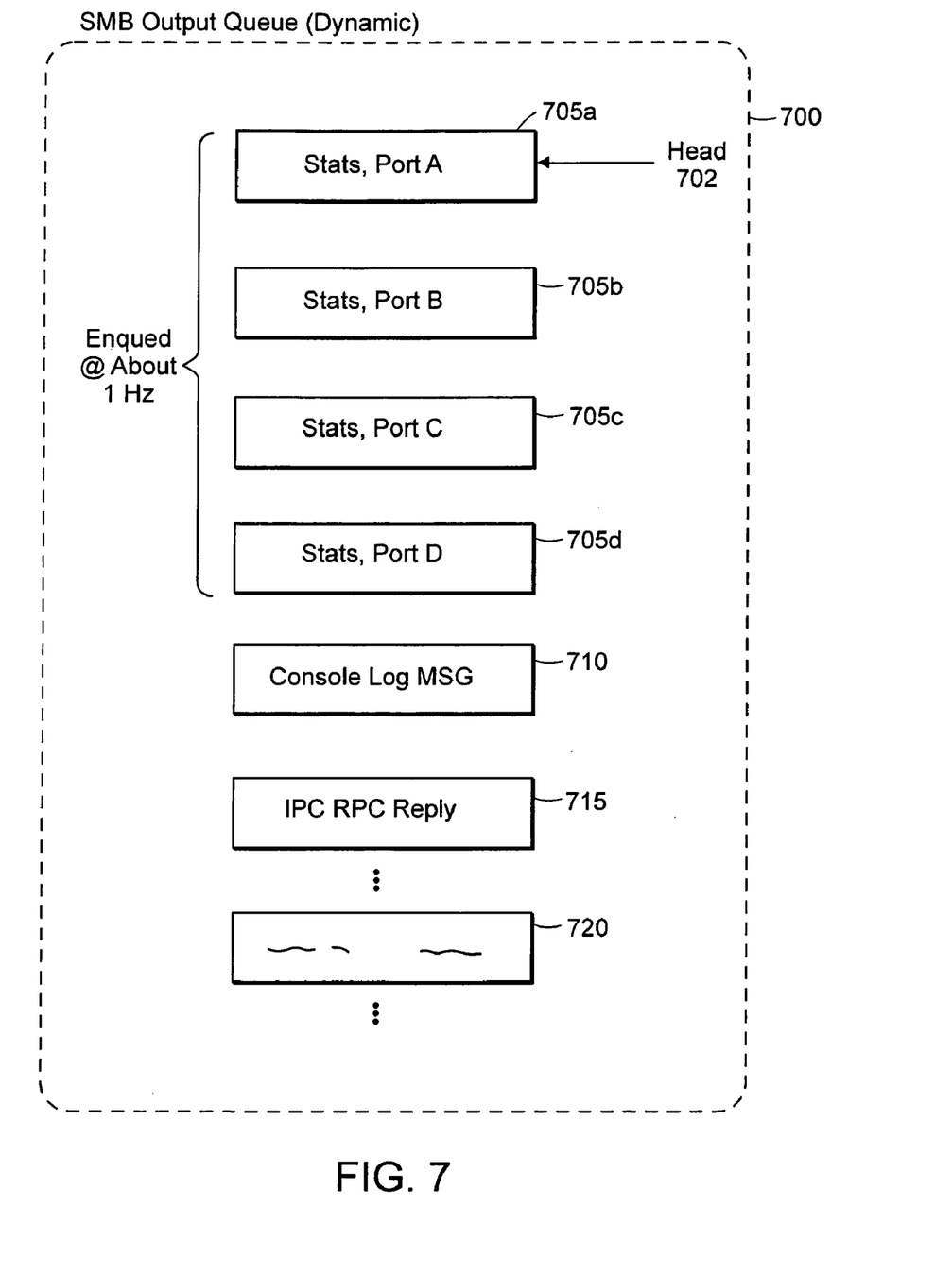
FIG. 7 is a flow diagram of datagrams used to communicate information between line cards and a system controller in the DSLAM of FIG. 3.

FIG. 7 is a block diagram of an output data buffer organized as a queue. The queue resides in a memory device in a line card. The information in the buffer includes statistical information about the ports, shown in messages 705, and information requested by the system controller about the line card in messages 710, 715, and 720.

The statistical information about the ports is automatically gathered by the processor 335 in the line cards 330 (FIG. 3). Because the buffer size in the line cards is limited in size, it is important not to put too much information in the buffer. If there is no free buffer memory for several seconds (e.g., 10 seconds), then the line card crashes and is reset automatically as if the power were cycled. If the line card crashes, then the respective port modems must be retrained, which can take up to a minute, a long time in the area of telecommunications. It should be understood that the message buffer is storage space for both incoming and outgoing messages, to and from the line card, respectively. Therefore, it is important to limit the amount of statistical information in the output queue at any given time.

Preferably, a message including port statistical data is represented in the output queue only once. Further, the processor may control the statistical data in the output queue in other ways. For example, the statistical data about port A may be limited to being gathered about as often as the system controller gathers the statistical data (e.g., 1 second). In other words, the statistical data is gathered in the output buffer as often as necessary, but not so often that the buffer is congested by the statistical data.

When the output buffer is set-up as an output queue, the output queue 700 has a head of the queue pointer 702. In this case, the head of the queue pointer is positioned at the statistical data message of port A 705A. In situations where the line card would otherwise report a null response, the message at the head of the queue, whether a statistical data message or other message configured to be self-identifying, is sent to the system controller rather than a null response, as indicated by the message 530 (FIG. 5). After being reported, the respective statistical data is gathered again from the port and stored in the queue for future reporting, of course in the controlled manner as described above. In an alternate embodiment, a statistical data pointer is employed in addition to a head of the queue pointer. The message pointed to by the statistical data pointer is issued instead of the null message, the statistical data pointer moves to the next statistical data message. Optionally, the statistical data messages can be maintained in a separate output queue from the messages gathered in response to a system controller request message.

Figure 8A:
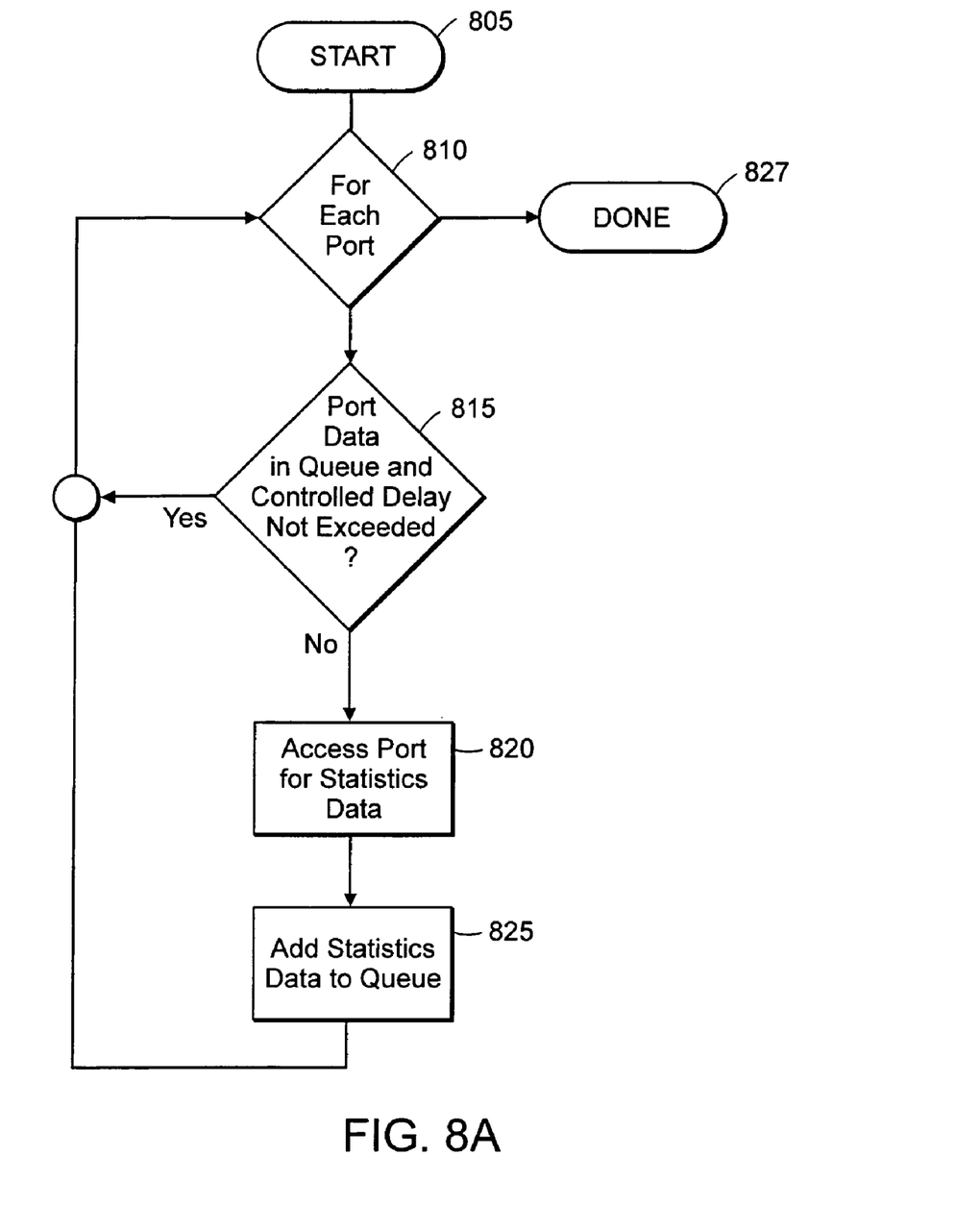
FIG. 8A is a flow diagram of data gathering activities by the line card of FIG. 3.

FIG. 8A is a flow diagram of an embodiment the process in the line card that gathers the statistical information about the high-bandwidth ports. After the process starts in step 805, a loop begins in step 810 to scan through each port. Of course, a loop is simply one software structure for implementing the gathering of information from each of the ports. Alternate software structures, such as object oriented classes, may also be employed. In step 815, a query is performed to determine if the port statistical data is already in the queue and the controlled delay is not exceeded. If either the data is in the queue or it is not yet time to gather the statistical data, then the process continues to the next port. If it is time to gather the statistical data from the port and the data is not in the queue, then, in step 820, the respective high-bandwidth port is accessed to gather the statistical data. In step 825, the statistical data is added to the queue. The process continues at step 810. After the statistical data is gathered, the process ends in step 827. The process restarts should one, some, or all of the statistical data messages be absent from the queue. In an alternate embodiment, the process is continuous, running in parallel with other processes or in the background.

Figure 8B:
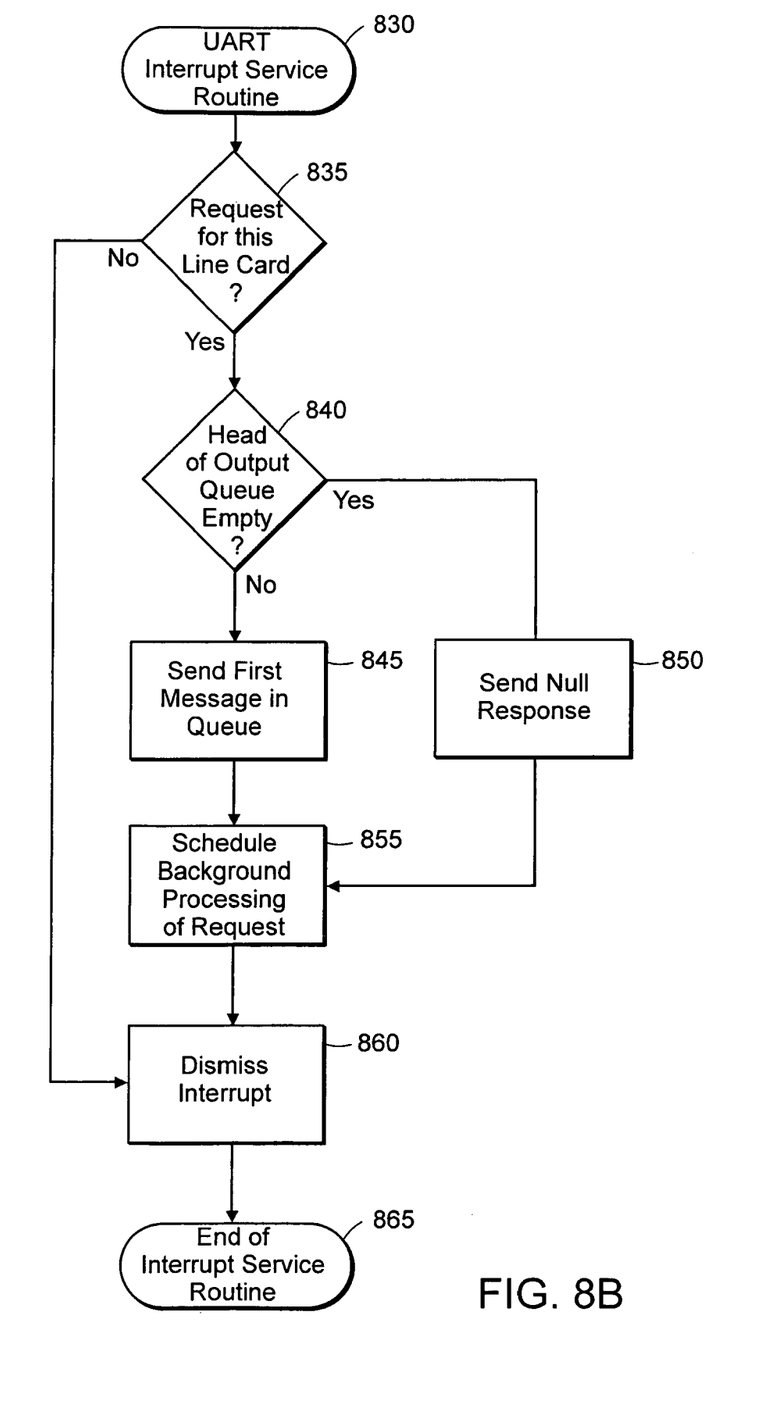
FIG. 8B is a flow diagram of an interrupt service routine for servicing a system controller request by the line card of FIG. 3.

FIG. 8B is a flow diagram of a process, executed by the line card, in which the system controller requests information, including statistical data about the ports. As indicated, the process is a system interrupt form of a routine. Upon receiving a message from the system controller, the UART interrupt service routine in the line card begins in step 830. The interrupt service routine performs a query 835 to determine if the request is intended for the line card on which the interrupt service routine is running. If the interrupt is not for "this" line card, then the interrupt is dismissed in step 860, and the interrupt service routine ends in step 865. In the query of step 840, if the head of the queue is not empty (e.g. a statistical datagram), then in step 845, the message at the head of the queue is returned to the system controller rather than a null response. Otherwise, if the head of the queue does not have a message to be transferred, a null response is returned to the system controller in step 850. The process continues in step 855 for processing the request. As discussed in reference to FIG. 7, in an alternate embodiment, the line card buffer has a "next port statistical data message" pointer, similar to the head of the queue pointer 702 (FIG. 7) to have a message always prepared to transmit in place of the null response message. After the request is processed in step 855, the interrupt is dismissed in step 860, and the interrupt service routine ends in step 865.

Figure 9A:
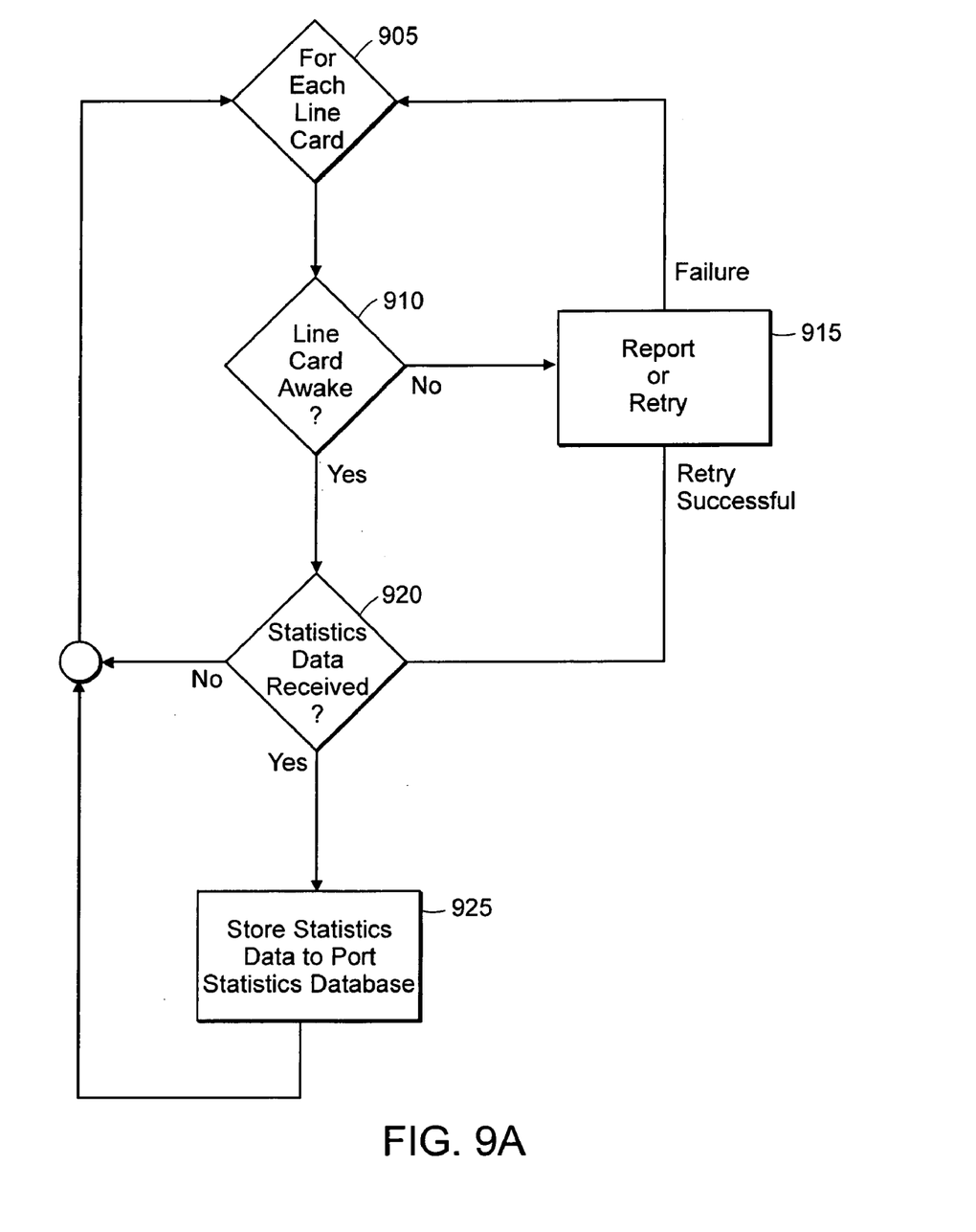
FIG. 9A is a flow diagram of statistics gathering activities by the system controller of FIG. 3.

FIG. 9A is a flow diagram of a process operating in the system controller. This process continually checks to determine the operational status of each line card. In the embodiment shown, a loop begins in step 905. A query 910 determines if the line cards are awake. If query 910 is answered NO, then in step 915, the process reports a failure, in one embodiment, or retries the line card, in an alternate embodiment. If the card is determined to be off-line, then the loop continues in step 905. If the retry is successful, then the process continues in step 920. If, in query 910, the line card is determined to be awake, then processing also continues in step 920.

Step 920 determines whether statistical data has been received. If the statistical data has been received, then processing continues in step 925, where the statistical data is stored to a port statistics database. The port statistics database stores information until it is retrieved by the network management station 240 (FIG. 2). Processing continues in step 905 if statistical data has not been received.

According to the principles of the present invention, the system controller need only determine if statistical data has been received, as opposed to accessing the line cards for the statistical data, because of the self-identifying flag set by the line card message. Note that the system controller typically does not have to explicitly request the statistics information about any of the ports in the line cards because of the automatic collection and transmission by the line card to the system controller. However, in one embodiment, the system controller comprises a routine for gathering the statistical data according to the standard, half-duplex, bus protocol in case there is no opportunity for the statistical data to be reported by the line card to the system controller in place of a null response.

Figure 9B:
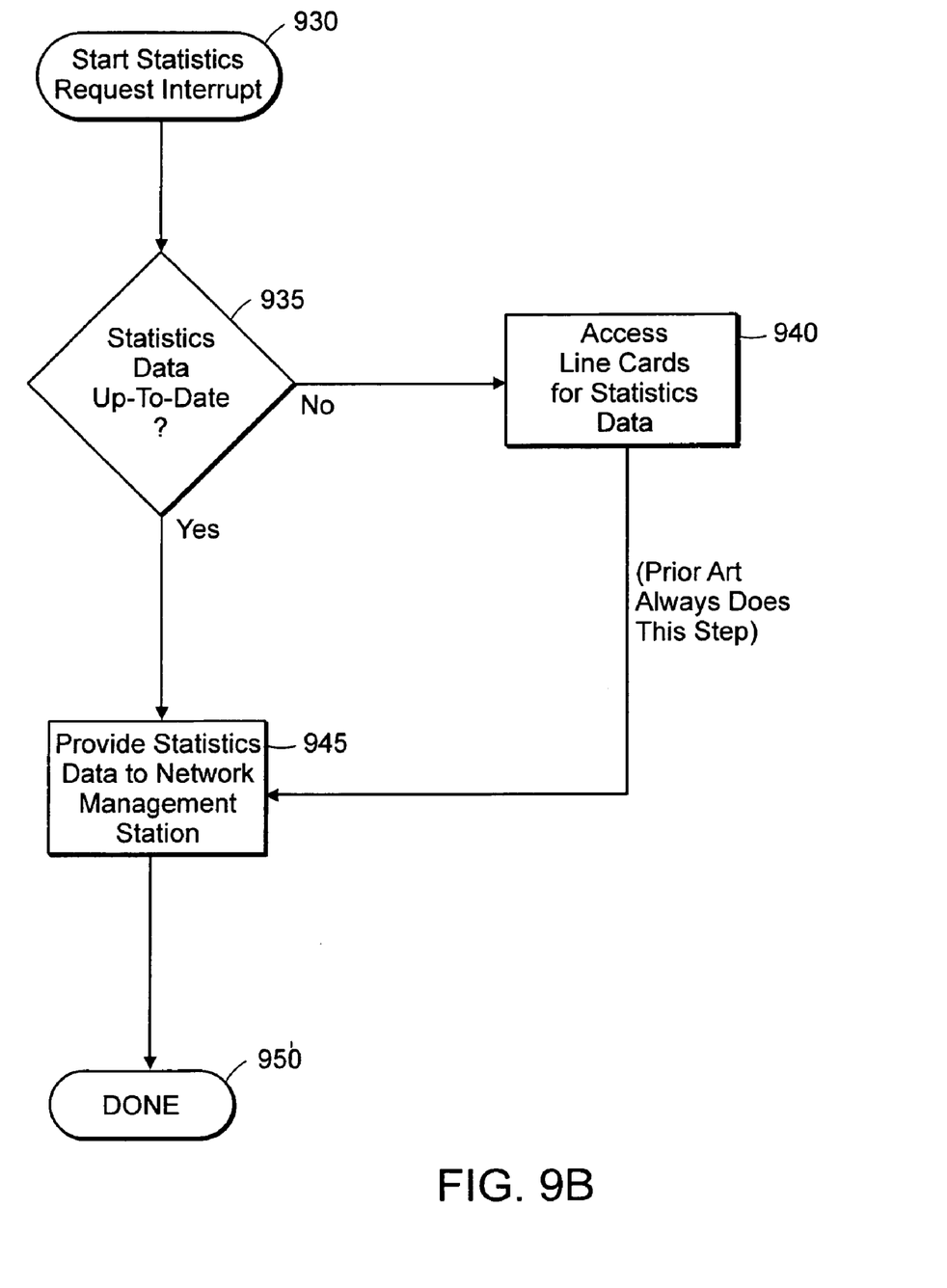
FIG. 9B is a flow diagram of reporting activities of the gathered statistics information by the system controller of FIG. 3 to a network management station.

FIG. 9B is a flow diagram of the next step in the process for the statistical data. The system controller receives a statistical data request by the network management station 240 (FIG. 2). In this case, an interrupt service routine is started in step 930. The system controller receives the request for current statistics or statistical data from the network management station. In query 935, the system controller determines if the statistical data is up-to-date. If the statistical data is not up-to-date, then the system controller accesses the line cards for the statistical data in step 940. Note that the prior art must always do this step, but rarely, if ever, will the present invention require the system controller to fetch the statistical data. If the statistical data is up-to-date as determined by query 935, then processing continues in step 945. Note that in the SNMP protocol, the up-to-date rate is one time per second. Other data collecting protocols may require other statistical data update rates. In step 945, the system controller provides the statistical data to the network management station. The process is done in step 950.

It should be understood that the respective processes may be implemented in software in the central processor and line cards. The software is executed by a processor. The software is typically stored in a processor storage medium, such as RAM, ROM, CD-ROM, magnetic disk, or remote storage medium, in which case the executable processor instructions are transmitted across a network during initialization of the system controller. It should also be understood that the elements may be line cards or other processing devices, such as intelligent network appliances, factory machines, or other devices operating on a half-duplex serial bus.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for reducing bandwidth consumed by gathering statistical data via a half-duplex communication bus, comprising:
   a system controller gathering statistical data via a half-duplex communication bus;
   at least one element in the system also on the half-duplex communication bus, said element:
   (i) in a controlled manner, automatically pre-gathering the statistical data in an information buffer in the element; and
   (ii) reporting a subset of the statistical data in the buffer to the system controller in response to being polled at times when polled for the statistical data and at other times when polled for a reason other than for the statistical data;
   the automatic pre-gathering and subsequent reporting of statistical data reducing the number of communications and data transfer cycles required to transfer the statistical data from the element to the system controller resulting in a reduction of bandwidth consumed by gathering the statistical data from the element via the half-duplex communication bus; and
   the system controller determining if the statistical data is up-to-date and accessing the at least one element for the statistical data only if the age of the statistical data in the controller is older than a predefined threshold indicating that the statistical data was not timely sent in place of a null response by the at least one element.

2. The system according to claim 1 wherein the buffer is organized in a queue and the statistical data is reported after the statistical data has reached the head of the queue.

3. The system according to claim 1 wherein the element is a line card having at least one processor monitoring at least one communication port.

4. The system according to claim 1 wherein the system reports the gathered statistical data to a central statistical data gathering system.

5. The system according to claim 1 wherein:
   the statistical data includes information about an element communication port; and
   the buffer stores only one instance of information about a communication port at any given time.

6. The system according to claim 1 wherein the element makes statistical data regarding respective ports available at least as often as the system controller requires the statistical data.

7. The system according to claim 1 wherein the element makes the statistical data available at least one time per second.

8. The system according to claim 1 wherein the element pregathers the statistical data available as often as necessary but not so often that the buffer is congested by the statistical data.

9. The system according to claim 1 wherein the element reports statistical data in place of reporting a null response.

10. A method for reducing bandwidth consumed by gathering statistical data on a half-duplex communication bus, comprising:
    gathering statistical data from at least one element in a multiprocessor system employing the half-duplex bus;
    automatically pre-gathering the statistical data in an information buffer in a controlled manner by the at least one element in the multiprocessor system; and
    reporting the statistical data from the buffer to a system controller in response to being polled at times when polled for the statistical data and at other times when polled for a reason other than for the statistical data;
    the automatic pre-gathering and subsequent reporting reducing the number of communications and data transfer cycles required to transfer the statistical data from the element to the system controller resulting in a reduction of bandwidth consumed by gathering the statistical data about the elements via the half-duplex communication b bus; and
    determining if the statistical data in the system controller is up-to-date and accessing the at least one element for the statistical data only if the statistical data in the system controller was not timely sent in place of a null response by the at least one element.

11. The method according to claim 10 wherein the element further comprises:
    organizing the data in the buffer in a queue; and
    reporting the statistical data after the statistical data has reached the head of the queue.

12. The method according to claim 10 wherein the element is a line card having at least one processor monitoring at least one communication port in the line card.

13. The method according to claim 10 further comprising reporting to a central statistical data gathering system the statistical data gathered from the elements.

14. The method according to claim 10 wherein:
    the statistical data refers to an element communication port; and
    the buffer stores only one instance about an element communication port at any given time.

15. The method according to claim 10 wherein automatically pre-gathering statistical data is performed at least as often as the statistical data is gathered by the system controller.

16. The method according to claim 10 wherein automatically pre-gathering statistical data is performed at least one time per second.

17. The method according to claim 10 wherein automatically pre-gathering statistical data is performed as often as necessary but not so often that the buffer is congested by the statistical data.

18. The method according to claim 10 wherein reporting the statistical data is performed in place of reporting a null response.

19. A system for reducing the bandwidth consumed by gathering statistical data via a half-duplex communication bus, comprising:
    means for gathering statistical data from at least one element in the system employing a half-duplex communication bus;

means for automatically pre-gathering the statistical data, in a controlled manner, in a buffer associated with the means for automatically pre-gathering statistical data; and means for reporting the statistical data to said means for gathering the statistical data in response to being polled at times when polled for the statistical data and at other times when polled for a reason other than for the statistical data and the statistical data is selected to be reported;

said means for automatically pre-gathering and said means for reporting reducing the number of communications and data transfer cycles required to transfer the statistical data from the element to the means for gathering the statistical data resulting in a reduction of bandwidth consumed by gathering the statistical data about the elements via the half-duplex communication bus; and said means for gathering the statistical data including means for determining if the statistical data in the system controller is up-to-date and means for accessing the at least one element for statistical data only if the statistical data in the system controller was not timely sent in place of a null response by the at least one element.

20. An apparatus for reducing the bandwidth consumed by gathering statistical data on a half-duplex communication bus, comprising:

at least one communication port having high-speed communication capabilities with external devices;

a processor coupled to the communication port, the processor maintaining statistical data about the communication port;

a buffer coupled to the processor, the processor automatically pre-gathering in the buffer, in a controlled manner, the statistical data; and an interface transmitting the statistical data to the system controller in response to being polled at times when polled for the statistical data and at other times when polled for a reason other than for the statistical data and the statistical data is selected to be reported; and the processor adapted to respond to a request for the statistical data from the system controller, the request received from the system controller only if the statistical data was not timely sent to the system controller in place of a null response by the processor.

21. The apparatus according to claim 20 wherein the statistical data in the buffer is organized in a queue.

22. The apparatus according to claim 20 wherein the processor limits the statistical data in the buffer to one entry per port at any given time.

23. The apparatus according to claim 20 wherein the processor pre-gathers statistical data associated with a port at at least the rate of being requested by the system controller.

24. The apparatus according to claim 20 wherein the processor pre-gathers data about a port as often as necessary but not so often that the buffer is congested by the statistical data.

25. The apparatus according to claim 20 wherein the statistical data is reported in place of reporting a null.

26. In a line card having at least one communication port, a method for reducing the bandwidth consumed by gathering statistical data on a half-duplex communication bus, comprising:

maintaining statistical data about at least one communication port;

automatically pre-gathering the statistical data in a buffer;

transmitting the statistical data to a system controller in response to being polled at times when polled for the statistical data and at other times when polled for a reason other than for the statistical data and the statistical data is selected to be reported; and responding to a request from the system controller for the statistical data, the request received from the system controller only if the statistical data was not timely sent to the system controller in place of a null response by the processor.

27. The method according to claim 26 wherein the statistical data in the buffer is organized in a queue.

28. The method according to claim 26 wherein pre-gathering the statistical data in the buffer limits the number of entries per port in the buffer.

29. The method according to claim 26 wherein pre-gathering the statistical data in the buffer occurs at at least the rate of requests for data about an individual port.

30. The method according to claim 26 wherein pre-gathering the statistical data in the buffer occurs as often as necessary but not so often that the buffer is congested by the statistical data.

31. The method according to claim 26 wherein transmitting the statistical data occurs in place of transmitting a null response message.

32. An apparatus for reducing the bandwidth consumed by gathering statistical data on a half-duplex communication bus, comprising:

means for supporting high-speed communications with external devices;

means for pre-gathering statistical data about the means for supporting high-speed communications;

means for automatically reporting the statistical data to a requesting device in response to being polled at times when polled for the statistical data and at other times when polled for a reason other than for the statistical data and the statistical data is selected to be reported; and said means for automatically reporting the statistical data adapted to respond to a request for the statistical data from the system controller, the request received from the system controller only if the statistical data was not timely sent to the system controller by the processor in place of a null response.

33. A computer program product, comprising:

a computer usable medium for storing data;

a set of computer program instructions embodied on the computer usable medium, including instructions to:

maintain statistical data about at least one communication port;

automatically pre-gather the statistical data in a buffer;

transmit the statistical data to a system controller in response to being polled at times when polled for the statistical data and at other times when polled for a reason other than for the statistical data and the statistical data is selected to be reported; and respond to a request from the system controller for the statistical data, the request received from system controller only if the statistical data was not timely sent to the system controller in place of a null response by the processor.

34. The computer program product according to claim 33 wherein the instructions further include instructions to organize the statistical data in the buffer in a queue.

35. The computer program product according to claim 33 wherein the instructions further include instructions to limit the statistical data in the buffer.

36. The computer program product according to claim 33 wherein the instructions further include instructions to pre-gather the statistical data available at at least the rate of being requested by the system controller.

37. The computer program product according to claim 33 wherein the instructions further include instructions to pre-gather the statistical data available as often as necessary but not so often that the buffer is congested by the statistical data.

38. The computer program product according to claim 33 wherein the instructions further include instructions to report a subset of the statistical data in place of reporting a null.

39. A system for reducing bandwidth consumed by gathering data via a communication bus, comprising:
   a system controller gathering data on a communication bus;
   at least one element in the system also on the communication bus, said element:
   (i) automatically pre-gathering the data in a buffer;
   (ii) reporting a subset of the data in the buffer to the system controller in response to being polled at times when polled for the statistical data and at other times when polled for a reason other than for the statistical data; and
   (iii) responding to a request for the statistical data from the system controller, the request received from the system controller only if the statistical data was not timely sent to the system controller in place of a null response by the processor.

40. A method for reducing bandwidth consumed by gathering data via a communication bus, comprising:
   automatically pre-gathering substantive data in a buffer;
   in response to being polled at times when polled for the statistical data and at other times when polled for a reason other than for the substantive data, reporting the substantive data from the buffer instead of non-substantive data; and
   responding to a request from a system controller for the statistical data, the request received from the system controller only if the statistical data was not timely sent to the system controller in place of a null response by the processor.

* * * * *